Patented Dec. 27, 1949

2,492,243

UNITED STATES PATENT OFFICE 2,492,243

ESTERS OF PENILLIC AND ISOPENILLIC ACIDS

John C. Sheehan, Arlington Heights, Mass., and Max Tishler, Rahway, N. J., assignors to Merck & Co., Inc., Rahway, N. J., a corporation of New Jersey No Drawing. Application November 8, 1946, Serial No. 708,817

15 Claims. (Cl. 260—302)

This invention is concerned generally with novel chemical compounds and with processes for preparing the same; more particularly it relates to alkyl esters of G-penillic and G-isopenillic acids, important intermediates in the synthesis of penicillin, and with intermediate products and processes employed in the synthesis of the same from readily available starting materials. These G-penillic and G-isopenillic esters are further useful in determining the structure of penicillin degradation products, and in establishing the configuration of the penicillins and other organic compounds having antibiotic activity.

G-penillic and G-isopenillic acids have been prepared from penicillin by treatment with dilute aqueous mineral acid, (Science 102, 627–629 (1945)). Prior to applicants' discovery, however, no method existed for synthesizing these acids from readily available starting materials, nor was any method known for preparing applicants' novel alkyl G-penillates and alkyl G-isopenillates.

It has been determined that the dialkyl esters of G-penillic acid, which can be prepared according to the presently invented process, are stereoisomers of 2,2-dimethyl-3,7-dicarboalkoxy-5-benzyl-2,3,7,8-tetrahydroimidazo(5,1-b) thiazole. These dialkyl esters of G-penillic acid can be represented by the following generic formula:

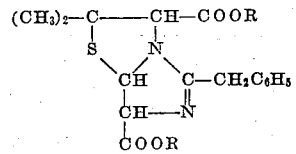

wherein R is an alkyl radical. These esters are isomeric with the corresponding dialkyl esters of G-isopenillic acid, which can be chemically designated as alkyl β-mercapto-α-(2-benzyl-4-carboalkoxy-imidazolyl-1)-isovalerates. These dialkyl esters of G-isopenillic acid can be represented by the following generic formula:

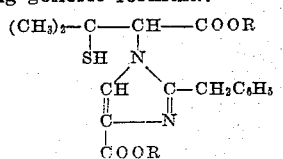

wherein R has the significance above defined.

It is now discovered, in accordance with the present invention, that esters of G-penillic and G-isopenillic acids can be synthesised by reactions indicated generically as follows:

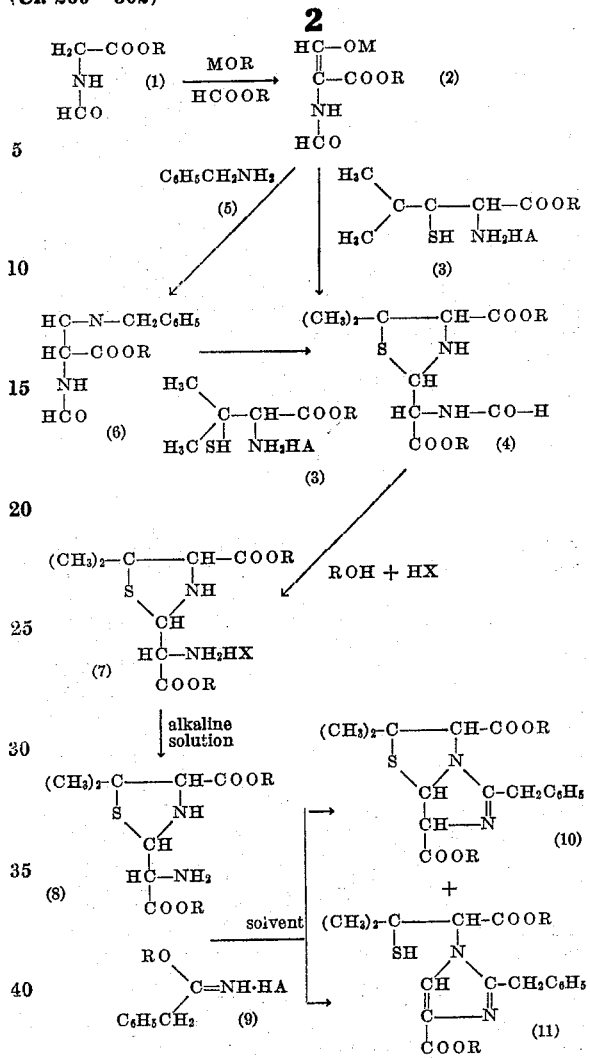

wherein R is an alkyl radical, HX is a hydrogen halide, HA is a mineral acid. The reactions indicated above are conducted as follows: An alkyl ester of N-formyl glycine (1) is reacted with an alkyl formate and an alkali metal alcoholate to produce the corresponding α(metallo-formyl)-N-formyl glycine ester (2); this compound is condensed with a mineral acid salt of an alkyl α-amino-β-mercapto isovalerate (3) to produce the corresponding 2-(formamido, carboalkoxymethyl)-4-carboalkoxy-5,5-dimethyl-thiazolidine (4). Alternatively, the metallo-formyl-N-formyl glycine ester (2) can be reacted with benzylamine (5) to form the corresponding alkyl α-formamido-β-benzylamino-propionate (6), and this condensation product is then reacted with said mineral acid salt of an alkyl α-amino-β-mercapto isovaleric ester (3) to produce the 2-(formamido, carboalkoxy-methyl)-4-carboalkoxy-5,5-dimethyl-thiazolidine (4). This thiazolidine compound is subjected to partial hydrolysis or alcoholysis whereby the formamido group is hydrolyzed without affecting the ester linkages to produce the corresponding ester of the amine hydrohalide (7). This compound is then reacted with a weakly alkaline solution to produce the 2-(amino, carboalkoxy-methyl)-4-carboalkoxy-5,5-dimethyl-thiazolidine (8). When this compound is reacted with a mineral acid salt of a phenacetimino-ether (9), the product obtained comprises an ester of G-penillic acid (10) admixed with the corresponding ester of G-isopenillic acid (11).

The present invention is concerned with alkyl G-penillates and alkyl G-isopenillates which can be chemically designated as alkyl esters of 2,2-dimethyl-3,7-dicarboxy-2,3,7,8-tetrahydro-imidazo (5,1-b) thiazole, and alkyl esters of β-mercapto-α-(4-carboxy-imidazolyl-1)-isovaleric acid, respectively. The invention is further concerned with processes for preparing these esters from readily available starting materials, namely 2-(amino, carboalkoxy-methyl)-4-carboalkoxy-5,5-dimethyl-thiazolidines, which can be represented by the following generic formula:

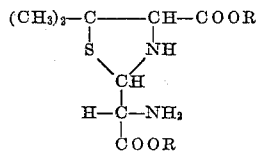

wherein R is an alkyl radical. These thiazolidine compounds can be prepared as indicated above and described in detail in our copending application, Serial No. 708,816 filed November 8, 1946.

In carrying out the presently invented process, a 2-(amino, carboalkoxy-methyl)-4-carboalkoxy-5,5-dimethyl-thiazolidine, such as 2-(amino, carbomethoxy-methyl)-4-carbomethoxy-5,5-dimethyl-thiazolidine, 2-(amino, carboethoxy-methyl)-4-carboethoxy-5,5-dimethyl-thiazolidine, 2-(amino, carbopropoxy-methyl)-4-carbobutoxy-5,5-dimethyl-thiazolidine, and the like, is reacted with a mineral acid salt of a phenacetimino-ether, such as methyl phenacetiminoether, ethyl phenacetiminoether, propyl phenacetiminoether, amyl phenacetiminoether, and the like, in the presence of a liquid which is a mutual solvent for the reactants, but which is a non-solvent for the ammonium salt produced by the reaction, as for example, ethylene dichloride.

It is presently preferred to maintain the reaction temperature at about 20° C. to 30° C. at which temperature the reaction is substantially complete in about 15 to 20 hours, but higher or lower temperatures can be employed if desired. As the reaction proceeds, the ammonium salt formed during the reaction precipitates, and, at the end of the reaction period, said ammonium salt is filtered and the solvent solution evaporated to produce a mixture of dialkyl penillate-G and dialkyl isopenillate-G, that is, 2,2-dimethyl 3,7-dicarboalkoxy-2,3,7,8-tetrahydro-imidazo (5,1-b) thiazole and alkyl β-mercapto-α-[4-carboalkoxy-imidazolyl-1]-isovalerate, which can be represented respectively by the following structural formulae:

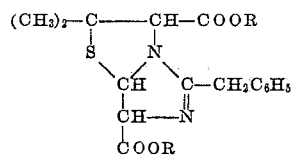

and

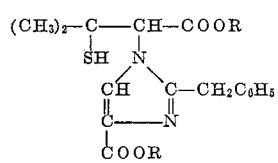

wherein R is an alkyl radical.

The mixture of dialkyl G-penillate and dialkyl G-isopenillate obtained by the presently invented process can be separated by fractional crystallization from a solvent to produce the pure compounds. For example, when the product consists of a mixture of dimethyl penillate G and dimethyl isopenillate G, the product is conveniently recrystallized from a dialkyl ether such as diethyl ether whereby the dimethyl penillate G crystallizes first and the dimethyl isopenillate G is obtained by evaporation and crystallization of the mother liquors.

These diesters of G-penillic and G-isopenillic acids can be converted to the corresponding mono esters by selective hydrolysis. This is accomplished in the case of the dialkyl G-penillates by reacting said diesters with an aqueous acid solution; the hydrolysis reaction should be conducted at a temperature below about 40° C.; it is presently preferred to carry out the reaction in an aqueous acid solution having a pH of about 0 to 1, and at a temperature of about 25–30° C. The product is recovered from the acidic hydrolysis solution by first neutralizing with alkaline material such as, sodium bicarbonate, barium hydroxide, and the like. This neutralized solution is decolorized by treatment with activated charcoal and is then lyophilized to produce a colorless powder, consisting of a mixture of the monoalkyl esters of G-penillic and G-isopenillic acids.

Alternatively the neutralized solution can be extracted with a solvent such as, butanol, amyl alcohol, and the like. When this solvent is evaporated, the product obtained likewise comprises a mixture of the mono ester of G-penillic acid admixed with the corresponding mono ester of G-isopenillic acid. The latter compound is formed during the hydrolysis and neutralization procedure by a tautomeric rearrangement of the G-penillic acid ester which involves rupture of the thiazole ring.

This mixture of mono esters is conveniently separated by fractional extraction with a solvent such as a hydrocarbon solvent, for example benzene, whereby the mono-alkyl G-isopenillate is extracted leaving crude mono-alkyl G-penillate as an insoluble precipitate which is recovered by filtration. The latter product can be purified, if desired, by dissolving in a chlorinated hydrocarbon solvent as, for example, chloroform, filtering to remove insoluble material, and precipitating therefrom by dilution with ether to produce mono-alkyl G-penillate in substantially pure form. The hydrocarbon solvent extract can be evaporated to produce crude mono-alkyl G-isopenillate; and the crude mono ester thus obtained can be purified by recrystallization from the hydrocarbon solvent to produce substantially pure mono-alkyl G-isopenillate.

The following examples illustrate methods of carrying out the present invention, but it is to be understood that these examples are given by way of illustration and not of limitation.

*Example 1*

About 1.60 g. of 2-(amino, carbomethoxymethyl)-4-carbomethoxy-5,5-dimethyl thiazolidine which can be prepared as described in co-pending application Serial No. 708,816, filed November 8, 1946, is dissolved in about 9 cc. of ethylene dichloride and the solution added to a solution containing about 1.22 g. of ethyl phenacetimino-ether hydrochloride dissolved in about 9 cc. of ethylene dichloride. The ammonium chloride begins to precipitate immediately from the clear solution and the mixture is allowed to stand for approximately 16 hours at about 20° C. The solution is then stirred with activated charcoal to clarify, the charcoal is removed by filtration and the solution evaporated to a syrup under reduced pressure and at a temperature below about 20° C. The syrup is extracted with boiling ether, the ether solution is filtered and the ether filtrate concentrated and cooled to fractionally crystallize substantially pure 2,2-dimethyl-3,7-dicarbomethoxy-5-benzyl 2,3,7,8-tetrahydro-imidazo-(5,1-b)-thiazole, otherwise known as dimethyl G-penillate; M. P. 133–135° C.;

$(\alpha)_D^{23} + 411°$

The melting point of a mixture of a sample of this compound prepared as above described with dimethyl penillate G from natural penicillin G showed no depression, and the utraviolet absorption spectrum was also identical with that of the natural ester. The structure was further confirmed by C, H, and N analysis.

The mother liquor from the above preparation is evaporated whereupon a further crop of colorless prisms crystallizes which consists of methyl β-mercapto-α-[2-benzyl-4-carbomethoxy-imidazolyl-(1)]-isovalerate, otherwise known as dimethyl G-isopenillate; M. P. 125–126° C.

*Example 2*

About 2 g. of 2,2-dimethyl-3,7-dicarbomethoxy-5-benzyl-2,3,7,8-tetrahydro-imidazo-(5,1-b)-thiazole is dissolved in about 12.3 cc. of approximately 1 N sulfuric acid and the solution diluted to approximately 25 cc. with approximately 0.1 N sulfuric acid. The resulting solution is allowed to stand for approximately 12 hours, during which time the rotation drops from approximately $(\alpha)_D^{23} + 411°$ to $(\alpha)_D^{23} + 362$. The resulting solution is cooled to about 0–5° C. and is neutralized carefully to a pH of approximately 5 with sodium bicarbonate and at the same time maintained at a temperature below about 5° C. The substantially neutral solution is extracted repeatedly with butanol; the butanol extracts are dried and the solvent therefrom evaporated under reduced pressure and at a temperature below about 25° C. The residual oil is digested twice with approximately 15 cc. portions of warm benzene and the benzene extracts evaporated to produce a colorless oil which crystallizes spontaneously upon standing. It is purified by washing with ether to produce substantially pure methyl β-mercapto-α-[2-benzyl-4-carboxy-imidazolyl-(1)]-isovalerate, otherwise known as the mono ester of isopenillic acid G, M. P. 170° (dec.); $(\alpha)_D^{23} -11°$.

*Example 3*

About 1 gm. of 2,2-dimethyl-3,7-dicarbomethoxy-5-benzyl-2,3,7,8-tetrahydro-imidazo-(5,1-b)-thiazole is dissolved in about 6.15 cc. of 0.9022 N sulfuric acid and the solution diluted to approximately 12.5 cc. with 0.1085 N sulfuric acid. The resulting solution is allowed to stand at about 31° C. for approximately 12 hours. The reaction solution is then cooled to about 0 to 5° C. and neutralized by adding thereto, over a forty minute period, the stoichiometric equivalent of 0.1 normal barium hydroxide solution. The neutralized solution is treated with activated charcoal and filtered and the clarified solution lyophilized to produce approximately 0.9 gm. of colorless powder, which can be shown by analysis to consist of a mixture of the mono esters of penillic acid G and isopenillic acid G. When this product is dissolved in chloroform and precipitated therefrom by the addition of ether there is obtained approximately 0.5 gm. of substantially pure 2,2-dimethyl-3-carbomethoxy-5-benzyl-7-carboxy-(5,1-b)-thiazole having an $\alpha_D^{23} = +300°$ C.

Modifications may be made in carrying out the present invention without departing from the spirit and scope thereof and our invention is to be limited only by the appended claims.

We claim:

1. The process of preparing a monoester selected from the class which consists of 2,2-dimethyl-3-carboalkoxy-5-benzyl-7-carboxy-2,3,7,8-tetrahydro-imidazo (5,1-b) thiazoles, which can be represented by the structural formula:

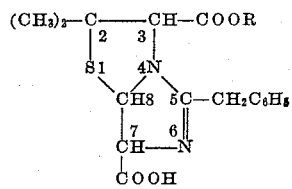

wherein R is an alkyl radical and alkyl β-mercapto-α-(2-benzyl-4-carboxy-imidazolyl-1)-isovalerates, which can be represented by the structural formula:

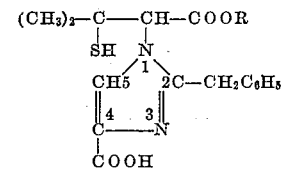

wherein R has the significance above-defined, which comprises reacting a 2-(amino, carboalkoxy-methyl)-4-carboalkoxy-5,5-dimethyl-thiazolidine, which can be represented by the structural formula:

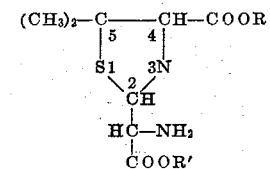

wherein R' is an alkyl radical and R has the significance above-defined, with a mineral acid salt of an alkyl phenacetimino ether to produce a diester selected from the class which consists of 2,2-dimethyl-3,7-dicarboalkoxy-5-benzyl-2,3,7,8- tetrahydroimidazo (5,1-b) thiazoles, which can be represented by the structural formula:

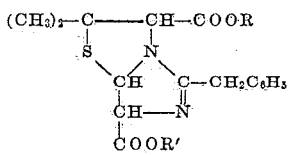

wherein R and R' have the significance above-defined, and alkyl β-mercapto-α-(2-benzyl-4-carboalkoxy-imidazolyl-1)-isovalerates, which can be represented by the structural formula:

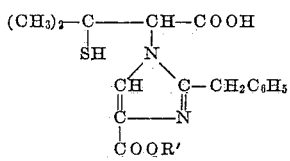

wherein R and R' have the significance above-defined, and partially hydrolyzing this diester by reaction with an aqueous acid solution at a temperature below about 40° C.

2. The process of preparing 2,2-dimethyl-3-carboalkoxy-5-benzyl-7-carboxy - 2,3,7,8 - tetrahydro-imidazo (5,1-b) thiazole which comprises reacting 2-(amino,carboalkoxy-methyl)-4-carboalkoxy-5,5-dimethyl-thiazolidine with a mineral acid salt of an alkyl phenacetimino-ether to produce a mixture of 2,2-dimethyl-3,7-dicarboalkoxy-5 - benzyl - 2,3,7,8 - tetrahydro - imidazo (5,1-b) thiazole and alkyl β-mercapto-α-(2-benzyl-4-carboalkoxy - imidazolyl - 1) - isovalerate, separating the 2,2-dimethyl-3,7-dicarboalkoxy-5-benzyl-2,3,7,8-tetrahydro-imidazo (5,1-b) thiazole from this mixture by fractional crystallization, and partially hydrolyzing said thiazole compound by reaction with an aqueous acid solution at a temperature below about 40° C.

3. The process of preparing an alkyl β-mercapto-α-(2-benzyl-4 - carboxy - imidazolyl - 1) - isovalerate which comprises reacting 2-amino, carboalkoxy - methyl) - 4 - carboalkoxy - 5,5-dimethyl thiazolidine with a mineral acid salt of an alkyl phenacetimino-ether to produce a mixture of 2,2-dimethyl-3,7-dicarboalkoxy-5-benzyl-2,3,7,8-tetrahydro-imidazo (5,1-b) thiazole and alkyl β - mercapto - α-(2-benzyl-4-carboalkoxy-imidazolyl-1) isovalerate, separating the alkyl β-mercapto - α -(2-benzyl-4-carboalkoxy-imidazolyl-1)-isovalerate from this mixture by fractional crystallization and partially hydrolyzing said isovalerate compound by reaction with an aqueous acid solution at a temperature below about 40° C.

4. The process of preparing 2,2-dimethyl-3-carbomethoxy - 5 - benzyl - 7 - carboxy-2,3,7,8-tetrahydro-imidazo (5,1-b) thiazole which comprises reacting 2-amino, carbomethoxy-methyl)-4-carbomethoxy-5,5-dimethyl - thiazolidine with ethyl phenacetimino-ether hydrochloride in ethylene dichloride solution to produce a mixture containing 2,2 - dimethyl-3,7-dicarbomethoxy-5-benzyl-2,3,7,8-tetrahydro-imidazo (5,1-b) thiazole and methyl β-mercapto-α-(2-benzyl-4-carbomethoxy-imidazolyl-1) - isovalerate, dissolving said mixture in ether, fractionally crystallizing substantially pure 2,2 - dimethyl - 3,7 - dicarbomethoxy-5-benzyl - 2,3,7,8 - tetrahydro-imidazo-(5,1-b)-thiazole from said solution, and partially hydrolyzing said thiazole compound by reaction with an aqueous acid solution at a temperature below about 40° C.

5. The process which comprises reacting 2-(amino, carbomethoxy-methyl)-4-carbomethoxy-5,5-dimethyl-thiazolidine with ethyl phenacetimino-ether hydrochloride in ethylene dichloride solution to produce a mixture containing 2,2-dimethyl-3,7-dicarbomethoxy-5-benzyl - 2,3,7,8-tetrahydro-imidazo (5,1-b) thiazole and methyl β - mercapto - α - (2 - benzyl - 4-carbomethoxy-imidazolyl-1)-isovalerate, dissolving said mixture in ether, fractionally crystallizing substantially pure 2,2-dimethyl-3,7-dicarbomethoxy-5-benzyl-2,3,7,8-tetrahydro-imidazo (5,1-b) thiazole from said solution and reacting this thiazole compound with an aqueous acid solution at a temperature below about 40° C. to partially hydrolyze and isomerize said thiazole compound to produce methyl β-mercapto-α-(2-benzyl-4-carboxy-imidazolyl-1)-isovalerate.

6. The process of preparing a compound selected from the class which consists of 2,2-dimethyl-3,7-dicarboalkoxy-5-benzyl-2,3,7,8 - tetrahydroimidazo (5,1-b) thiazoles and alkyl β-mercapto-α - (2 - benzyl - 4 - carboalkoxy - imidazolyl-1)-isovalerates which comprises reacting a 2-(amino, carboalkoxy - methyl) - 4 - carboalkoxy-5,5-dimethyl-thiazolidine with a mineral acid salt of an alkyl phenacetimino-ether.

7. The process of preparing 2,2-dimethyl-3,7-dicarbomethoxy-5-benzyl - 2,3,7,8 - tetrahydro-imidazo(5,1-b) thiazole, which comprises reacting 2 - (amino, carbomethoxy - methyl)-4-carbomethoxy-5,5-dimethyl-thiazolidine with ethyl phenacetimino-ether hydrochloride in ethylene dichloride solution to produce a mixture containing 2,2 - dimethyl-3,7-dicarbomethoxy-5-benzyl-2,3,7,8-tetrahydro - imidazo(5,1-b) thiazole and methyl β-mercapto-α-(2-benzyl-4-carbomethoxy-imidazolyl-1)-isovalerate, dissolving said mixture in ether, and fractionally crystallizing substantially pure 2,2-dimethyl-3,7-dicarbomethoxy-5-benzyl-2,3,7,8-tetrahydro-imidazo (5,1-b) thiazole from said solution.

8. The process of preparing methyl β-mercapto-α-(2-benzyl-4-carbomethoxy - imidazolyl-1)-isovalerate, which comprises reacting 2-(amino, carbomethoxy-methyl) - 4 - carbomethoxy-5,5-dimethyl-thiazolidine with ethyl phenacetimino-ether hydrochloride in ethylene dichloride solution to produce a mixture containing 2,2 - dimethyl-3,7-dicarbomethoxy-5-benzyl-2,3,7,8-tetrahydro-imidazo-(5,1-b) - thiazole and methyl β-mercapto-α-(2-benzyl-4-carbomethoxy-imidazolyl-1)-isovalerate, dissolving said mixture in ether, separating the thiazole compound from said solution by fractional crystallization and evaporating the mother liquor to produce methyl β-mercapto-α-(2-benzyl-4 - carbomethoxy - imidazolyl-1)-isovalerate.

9. The process which comprises reacting a dialkyl G-penillate with an aqueous acidic medium at a temperature below about 40° C. to produce a compound selected from the class which consists of the corresponding monoalkyl G-penillate and the corresponding monoalkyl G-isopenillate.

10. The process which comprises reacting 2,2-dimethyl - 3 - carbomethoxy - 5-benzyl-7-carbomethoxy-imidazo-(5,1-b)-thiazole with aqueous mineral acid at a temperature below about 40° C., to produce 2,2-dimethyl-3-carbomethoxy-5-benzyl-7-carboxy-imidazo-(5,1-b)-thiazole.

11. d-2,2-dimethyl-3-carboalkoxy - 5 - benzyl-7-carboxy 2,3,7,8 - tetrahydro-imidazo - (5,1-b)- thiazole, which can be represented by the structural formula:

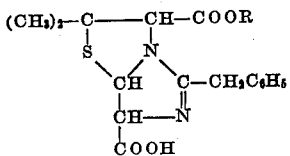

wherein R is an alkyl radical.

12. 2,2-dimethyl-3-carbomethoxy - 5 - benzyl-7-carboxy-2,3,7,8-tetrahydro-imidazo - (5,1-b)-thiazole having an $\alpha_D^{23}$ approximately equal to $+300°$.

13. Alkyl $\beta$ - mercapto-$\alpha$-(2-benzyl-4-carboxy-imidazolyl-1)-isovalerate, which can be represented by the structural formula:

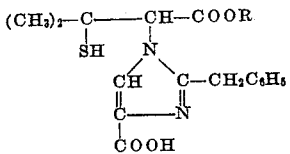

wherein R is an alkyl radical.

14. Methyl $\beta$-mercapto-$\alpha$-(2-benzyl-4-carboxy-imidazolyl-1)-isovalerate having a melting point of about 170° C. with decomposition and an $\alpha_D^{23}$ of approximately $-11°$.

15. A monoalkyl ester of a compound selected from the class which consists of d-penillic acid G having the structural formula:

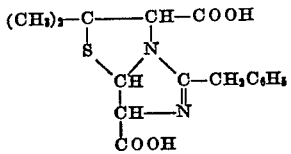

and isopenillic acid G having the structural formula:

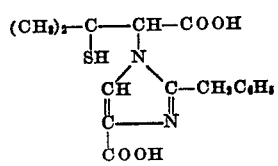

JOHN C. SHEEHAN.
MAX TISHLER.

REFERENCES CITED

The following references are of record in the file of this patent:

Squibb Institute, S. I., p. 6, Chemical Research on Penicillin, Dec. 20, 1943.
British Report XIX, page 10, Jan. 14, 1944.
British Report Br.—LXXXV, CPS—199, July 19, 1944, pp. 1 to 4 (received U. S., Aug. 31, 1944).
Merck Report XXII, page 7, July 31, 1944.
Merck Report on Structure of Penicillin G M 50, pp. 1-4, Nov. 30, 1944.
Merck Report M-53, Dec. 30, 1944, page 2.